(12) United States Patent
Jin

(10) Patent No.: US 11,653,420 B2
(45) Date of Patent: May 16, 2023

(54) BRAKE SYSTEM

(71) Applicant: Volvo Car Corporation, Gothenburg (SE)

(72) Inventor: Yongxing Jin, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 78 days.

(21) Appl. No.: 17/516,759

(22) Filed: Nov. 2, 2021

(65) Prior Publication Data

US 2022/0159789 A1 May 19, 2022

(30) Foreign Application Priority Data

Nov. 16, 2020 (CN) .......................... 202011278286.1

(51) Int. Cl.
| | | |
|---|---|---|
| *F16D 65/12* | (2006.01) | |
| *H05B 1/02* | (2006.01) | |
| *F16D 65/00* | (2006.01) | |
| *F16D 65/78* | (2006.01) | |
| *F16D 66/00* | (2006.01) | |

(52) U.S. Cl.
CPC ....... *H05B 1/0236* (2013.01); *F16D 65/0025* (2013.01); *F16D 65/123* (2013.01); *F16D 2065/785* (2013.01); *F16D 2066/001* (2013.01); *F16D 2300/04* (2021.01)

(58) Field of Classification Search
CPC . H05B 1/0236; F16D 65/0025; F16D 65/123; F16D 2300/04; F16D 2065/785; F16D 2066/001
USPC ........................................ 188/1.11 E, 1.11 L
See application file for complete search history.

(56) References Cited

U.S. PATENT DOCUMENTS

| | | | | |
|---|---|---|---|---|
| 4,667,781 A | * | 5/1987 | Lilley | ..................... B64C 25/44 |
| | | | | 219/202 |
| 5,266,773 A | * | 11/1993 | Granborg | ................. H05B 6/10 |
| | | | | 219/202 |
| 7,051,846 B2 | * | 5/2006 | Lee | ..................... F16D 65/0037 |
| | | | | 188/161 |

(Continued)

FOREIGN PATENT DOCUMENTS

| | | |
|---|---|---|
| EP | 0962675 A2 | 12/1999 |
| EP | 1840402 A1 | 10/2007 |

(Continued)

OTHER PUBLICATIONS

Apr. 25, 2022 European Search Report issued in corresponding International Application No. 21207305.

*Primary Examiner* — Christopher P Schwartz
(74) *Attorney, Agent, or Firm* — Clements Bernard Walker; Christopher L. Bernard

(57) ABSTRACT

A brake system comprising a brake disc, a wheel hub connected to the brake disc, and a bearing assembly mounted around the wheel hub, the brake system further comprising: a first electric circuit embedded inside the brake disc; a second electric circuit embedded inside the wheel hub and electrically connected with the first electric circuit; and a third electric circuit embedded inside the bearing assembly and electrically connected with the second electric circuit, wherein when an electric current flows to the first electric circuit through the second and third electric circuits, the first electric circuit generates heat for applying to the brake disc.

20 Claims, 7 Drawing Sheets

(56) References Cited

U.S. PATENT DOCUMENTS

| | | |
|---|---|---|
| 2019/0178322 A1 | 6/2019 | Merlo et al. |
| 2022/0243776 A1* | 8/2022 | Ravindranath ....... F16D 65/128 |

FOREIGN PATENT DOCUMENTS

| | | |
|---|---|---|
| JP | 2001113938 A | 4/2001 |
| JP | 2011189826 A | 9/2011 |

* cited by examiner

BRAKE SYSTEM

CROSS-REFERENCE TO RELATED APPLICATION

The present disclosure claims the benefit of priority of co-pending Chinese Patent Application No. 202011278286.1, filed on Nov. 16, 2020, and entitled "BRAKE SYSTEM," the contents of which are incorporated in full by reference herein.

TECHNICAL FIELD

The present disclosure relates to the field of vehicle safety and more particularly to a brake system.

BACKGROUND

A brake device installed in a vehicle is operated to perform braking of the vehicle, such that the vehicle can slow down, stop moving, or remain stationary. The safety of the vehicle and its occupants is directly affected by the structure and performance of the brake device. Generally, the brake device comprises a brake disc mounted to a wheel hub and brake pads that contact and press against both sides of the brake disc when a driver depresses a brake pedal, such that the vehicle is braked by friction between the brake disc and the brake pads. For example, the brake disc can be made of a metal material. As such, in low-temperature and/or high-humidity regions, the vehicle that has not been driven for a long time is very likely to have condensed water or even a thin layer of ice on the brake disc, as a result of which a slip may occur between the brake disc and the brake pads adversely affecting the brake performance of the brake device, and even rusting of the brake disc and the brake pads may happen. Moreover, the friction between the brake disc and the brake pads at low temperatures may cause unpleasant noise.

SUMMARY

The present disclosure is directed to provide a brake system, which functions well in a low-temperature and/or high-humidity environment.

In one aspect of the present disclosure, there is provided a brake system comprising a brake disc, a wheel hub connected to the brake disc, and a bearing assembly mounted around the wheel hub, the brake system comprising: a first electric circuit embedded inside the brake disc; a second electric circuit embedded inside the wheel hub and electrically connected with the first electric circuit; and a third electric circuit embedded inside the bearing assembly and electrically connected with the second electric circuit, wherein when an electric current flows to the first electric circuit through the second and third electric circuits, the first electric circuit generates heat for applying to the brake disc.

Optionally, the brake disc comprises a disc core and a disc body protruding radially from the disc core, the first electric circuit comprising an electrical resistance wire embedded inside the disc body for generating the heat and a first electrically conductive wire embedded inside the disc core and electrically connected with the resistance wire.

Optionally, the first electric circuit further comprises a first electrically insulating sheet attached to the disc core and a first electrically conductive sheet attached to the first insulating sheet, the first conductive wire passing through the first insulating sheet to be electrically connected with the first conductive sheet, and the second electric circuit comprises a second electrically conductive wire, a second electrically insulating sheet attached to the wheel hub, and a second electrically conductive sheet attached to the second insulating sheet, the second conductive wire passing through the second insulating sheet to be electrically connected with the second conductive sheet, and when the wheel hub is connected to the brake disc, the first conductive sheet is aligned with and in contact with the second conductive sheet.

Optionally, the first insulating sheet is formed as an electrically insulating ring that is attached to the disc core in a circumferential direction and the first conductive sheet is formed as an electrically conductive ring that is attached to the insulating ring in the circumferential direction.

Optionally, the wheel hub comprises an outer wall around which the bearing assembly is mounted and which is coated with an electrically insulating layer, the second electric circuit further comprises an electrically conductive loop arranged around the insulating layer, the second conductive wire passing through the insulating layer to be electrically connected with the conductive loop, and the third electric circuit comprises a brush terminal configured to be in contact with and slidable relative to the conductive loop.

Optionally, the third electric circuit further comprises an elastic element, the elastic element pressing the brush terminal against the conductive loop with a radial force directed in a direction toward a center of the conductive loop.

Optionally, the bearing assembly comprises a first row and a second row of rolling elements arranged around the outer wall, a first cage for holding the first row of rolling elements, and a second cage for holding the second row of rolling elements, one end of the elastic element abutting against the first and second cages, and the other end of the elastic element abutting against the brush terminal, such that the elastic element is preloaded with a force opposite to the radial force.

Optionally, the first and second cages are made of an electrically insulating material and a gap is formed between the first and second cages, the one end of the elastic element abutting against the first and second cages by spanning across the gap.

Optionally, a gap is formed between the first and second cages, and wherein the third electric circuit further comprises a third electrically insulating sheet and a third electrically conductive wire, the third electrically insulating sheet being attached to the first and second cages by spanning across the gap, such that the one end of the elastic element abuts against the first and second cages via the third insulating sheet, and the third electrically conductive wire passing through the third insulating sheet to be electrically connected with the brush terminal.

Optionally, the brake system further comprises an external electric circuit electrically connected with the third electric circuit and an electronic control unit configured to control on and off of the external electric circuit.

Optionally, the brake system further comprises a brake pad and a temperature sensor configured to detect an ambient temperature near the brake pad, wherein the electronic control unit is configured to control the on and off of the external electric circuit based on the detected temperature.

According to the present disclosure, the heat generated by the resistance wire can heat up the brake disc at low temperature for evaporating condensed or accumulated water on the brake disc, such that the brake disc can be kept dry in the low-temperature and/or high-humidity environment. Moreover, the electrical connection between the first and second electric circuits does not hinder the brake disc from mounting to or detaching from the wheel hub. Moreover, the electrical connection between the second and third electric circuits is completed inside the bearing assembly to adapt to a relative movement of the wheel hub and an outer race of the bearing assembly.

Further features of the present disclosure and advantages thereof are provided in the following detailed description of exemplary embodiments according to the present disclosure with reference to the attached drawings.

BRIEF DESCRIPTION OF THE DRAWINGS

The attached drawings, which are incorporated in and constitute a part of the specification, illustrate the embodiments of the present disclosure and, together with the description thereof, serve to explain the principles of the present disclosure.

DETAILED DESCRIPTION

Figure 1:
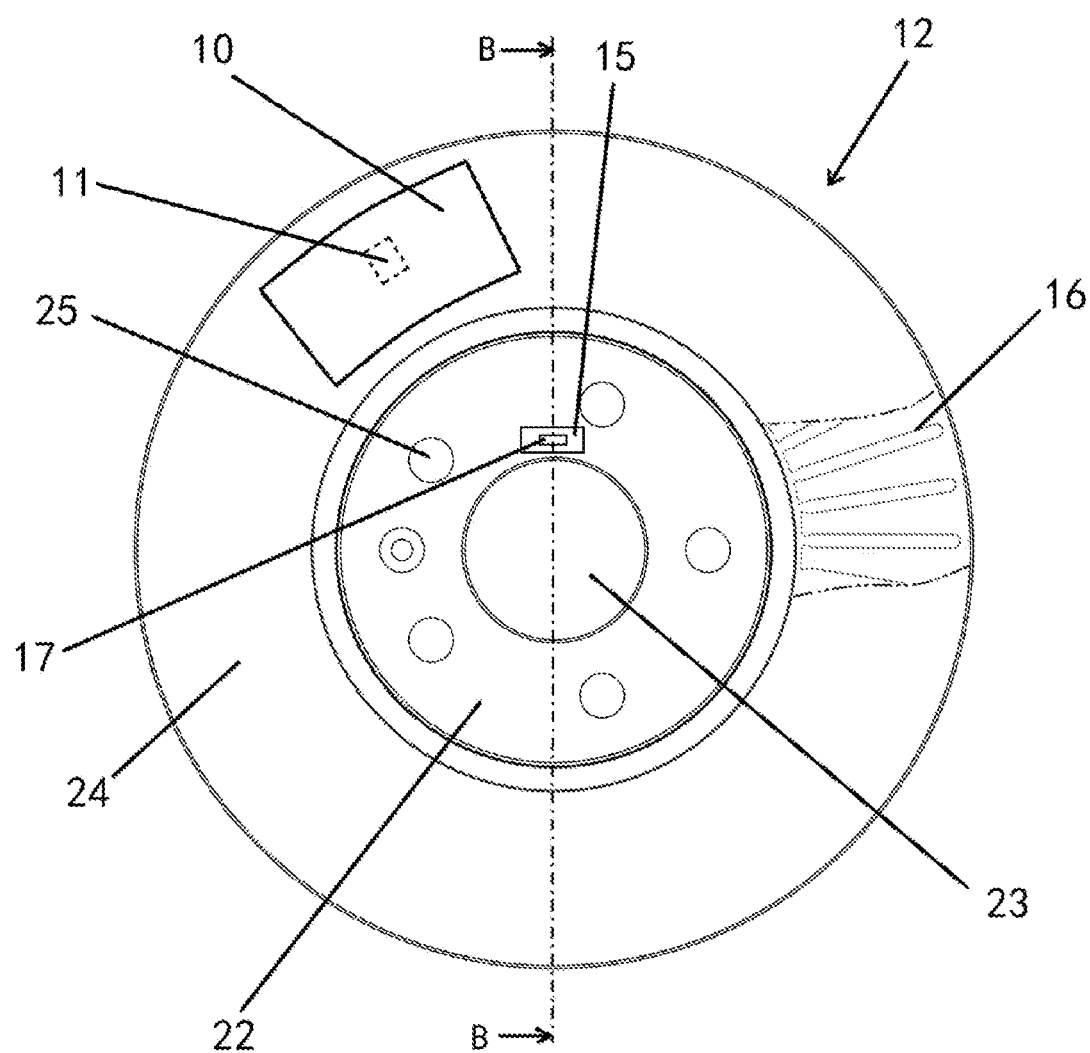
FIG. 1 is a front view of a brake system according to an embodiment of the present disclosure, showing the features related to a brake disc.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

Techniques, methods and apparatus as known by one of ordinary skill in the relevant art may not be discussed in detail but are intended to be part of the specification where appropriate.

The following description of one or more exemplary embodiments is merely illustrative in nature and is in no way intended to limit the present disclosure, its application, or uses. Therefore, other exemplary embodiments may have different values, structures, or features.

It should be noted that the same reference numerals and letters refer to the same items in the subsequent figures, and thus once an item is defined in one figure, it may not be further discussed for the subsequent figures.

The expression "electrically connected with" herein can refer to a connection between different components in an electric circuit via conductors or between different conductors in an electric circuit for conducting and/or utilizing an electric current; and the expression "leading" and "tailing", respectively, refer to upstream and downstream portions of the components and/or the conductors in a flow direction of the electric current.

Figure 2:
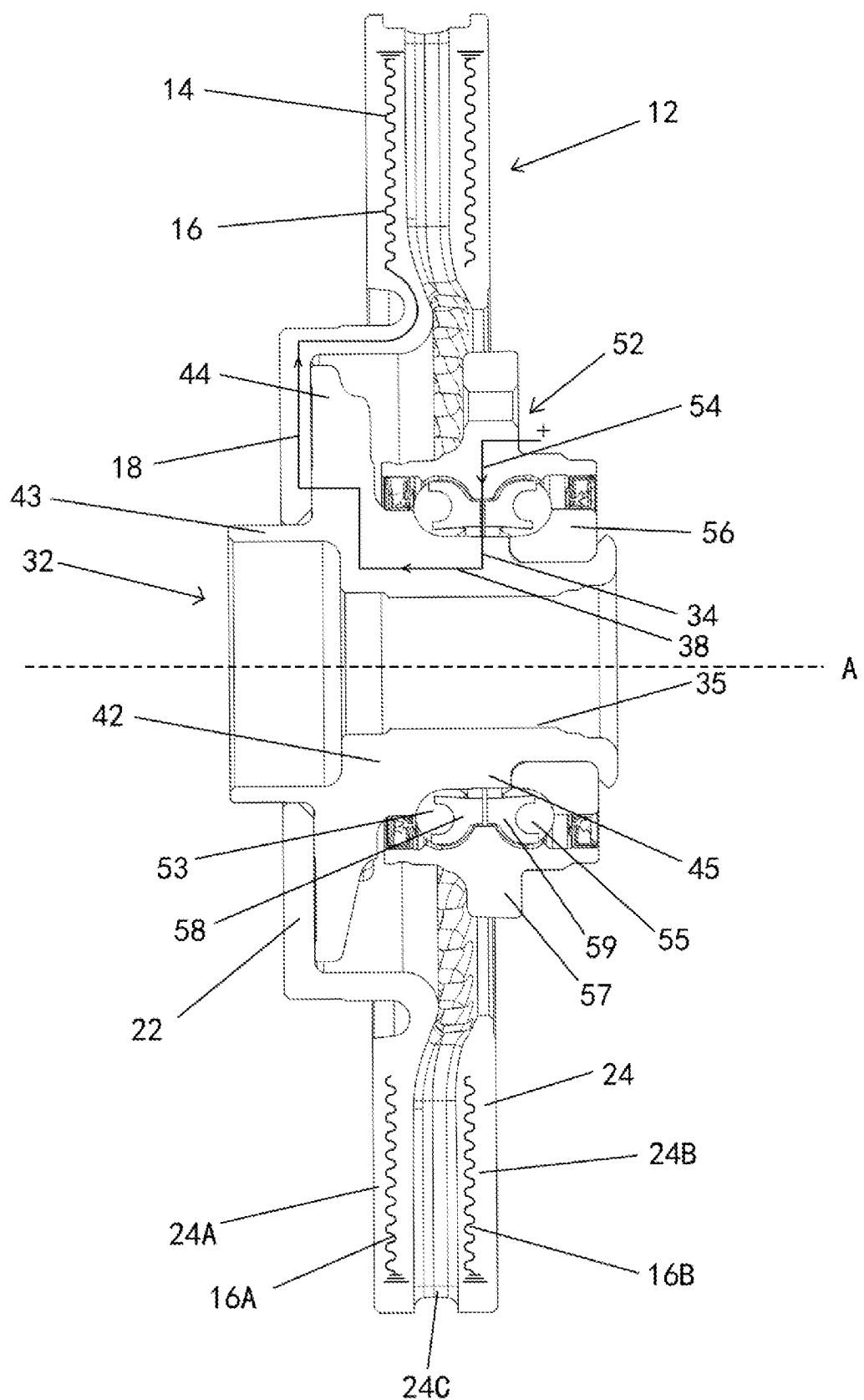
FIG. 2 is a cross-sectional view of the brake system taken along a line B-B in FIG. 1.

As shown in FIGS. 1 and 2, there is provided a brake system comprising: a brake disc 12 in which a first electric circuit 14 is embedded; a wheel hub 32 connected to the brake disc 12 and in which a second electric circuit 34 electrically connected with the first electric circuit 14 is embedded; and a bearing assembly 52 mounted around the wheel hub 32 and in which a third electric circuit 54 electrically connected with the second electric circuit 34 is embedded, wherein when an electric current flows to the first electric circuit 14 through the second electric circuit 34 and the third electric circuit 54, the first electric circuit 14 generates heat for applying to the brake disc 12.

The brake disc 12 can be made of a metal material and comprises a disc core (also referred to as a cap) 22 and a disc body (also referred to as a friction surface) 24 protruding radially from the disc core 22. The disc core 22 is provided with a central hole 23 and a first plurality of bolt openings 25 equidistantly distributed around the central hole 23. The disc body 24 may be configured as a solid disc body or with air ducts. The disc body configured with the air ducts comprises a first sub-disc body 24A and a second sub-disc body 24B that are significantly thinner than the solid disc body of the same size, and a spacer (also referred to as a ventilated rib) 24C for forming the air ducts by being sandwiched between the first sub-disk body 24A and the second sub-disk body 24B.

The wheel hub 32 can be made of a metal material and comprises an aperture 35 to receive and connect to a rotatable output shaft (not shown), such that the wheel hub 32 can be rotated with the output shaft. The wheel hub 32 comprises a substantially cylindrical hub body 42 and a hub flange 44 protruding radially from the hub body 42. For example, in an axial direction A, the hub body 42 is provided with a first outer wall 43 for passing through the central hole 23 of the disc core 22 and a second outer wall 45 around which the bearing assembly 52 is mounted. The hub flange 44 is integrally formed with the hub body 42 and is located between the first outer wall 43 and the second outer wall 45 in the axial direction A. Moreover, the hub flange 44 is provided with a second plurality of bolt openings (not shown) equidistantly distributed in a circumferential direction. When the first outer wall 43 of the hub body 42 passes through the central hole 23 of the wheel hub 22, the hub flange 44 abuts against the disc core 22 in such a manner that the first plurality of bolt openings 25 are aligned with the second plurality of bolt openings respectively, such that the brake disc 12 are connected to the wheel hub 32 by means of bolts threading through the first plurality of bolt openings 25 and the second plurality of bolt openings. As such, the brake disc 12 can be rotated with the wheel hub 32.

When a driver depresses a brake pedal to initiate brake pads 10 to contact and press against both sides of the disc body 24, a vehicle is braked by friction between the disc body 24 and the brake pads 10. The brake performance of the brake system is affected by condensed water or even a thin layer of ice formed on the disc body 24. As a result, the first electric circuit 14 provided in the brake system of the present disclosure generates heat for applying to the disc body 24 when the electric current flows to the first electric circuit 14, thereby preventing the condensed water or even the thin layer of ice from forming on the disc body 24.

Optionally, the first electric circuit 14 comprises an electrical resistance wire 16 embedded inside the disc body and a first electrically conductive wire 18 embedded inside the disc core 22 and electrically connected with the resistance wire 16. When flowing to the resistance wire 16, the electric current is converted into heat and transferred to the disk body 24. For example, a first channel for receiving the resistance wire 16 is pre-formed inside the disc body 24, thereby defining a guiding path of the resistance wire 16, and a second channel for receiving the first conductive wire 18 is pre-formed inside the disc core 22, thereby defining a guiding path of the first conductive wire 18. The guiding path of the resistance wire 16 can be designed in various ways. In an example, the guiding path of the resistance wire 16 can be substantially circular. In another example, the guiding path of the resistance wire 16 runs radially inwards and outwards inside the disc body 24, such that the resistance wire 16 is spread over the entire disk body 24, as illustrated in FIG. 1, showing a partial cutaway section of the disk body 24. In yet another example, the guiding path of the resistance wire 16 can be irregular.

In any case, a leading end of the first channel is connected to a tailing end of the second channel, such that a leading end of the resistance wire 16 can be electrically connected with a tailing end of the first conductive wire 18. It should be understood that a position where the leading end of the first channel is connected to the tailing end of the second channel and where the leading end of the resistance wire 16 is electrically connected with a tailing end of the first conductive wire 18 can be arranged inside the disc body or the disc core 22. Therefore, in fact, the leading ends of the first channel and the resistance wire 16 can enter into the disc core 22 to some extent; alternatively, the tailing ends of the second channel and the first conductive wire 18 can enter into the disc body 24 to some extent. Moreover, a tailing end of the first channel terminates inside the disc body 24, so that a tailing end of the resistance wire 16 is electrically connected with the disc body 24 and hence the brake disc 12. In other words, the brake disc 12 itself can be used as a negative electrode (shown by an earth symbol in FIG. 2) for conducting the electric current flowing though the resistance wire 16.

Optionally, for the case where the disc body 24 is configured with the air ducts, the first electric circuit 14 comprises a first sub-electrical resistance wire 16A embedded inside the first sub-disc body, a second sub-electrical resistance wire 16B embedded inside the second sub-disc body, and a first conductive wire 18 embedded inside the disc core and electrically connected with the first and second sub-resistance wires 16A, 16B respectively. For example, a leading end of the second sub-resistance wire 16B is electrically connected with the first sub-resistance wire 16A via an additional channel preformed in the spacer 24C, and then the first and second sub-resistance wires 16A, 16B connected in parallel are electrically connected with the tailing end of the first conductive wire 18.

Similarly, the guiding path of the first conductive wire 18 can be designed in various ways. Generally, the guiding path of the first conductive wire 18 is desired to be as short as possible and easy to manufacture. For this, the second channel is manufactured in such a way to avoid interfering with the first plurality of bolt openings 25 and extend in conformity with a cross section of the disc core 22 taken along a line B-B in FIG. 1. A leading end 19 of the second channel is open (see FIG. 3), so that the leading end of the first conductive wire 18 can be led out from the disc core 22.

In a manufacturing process of the brake system, the first electric circuit 14 may be pre-embedded inside the brake disc and the second electric circuit 34 may be pre-embedded inside the wheel hub 32. In a subsequent assembling process of the brake system, the brake disc 12 is connected to the wheel hub 32, but the brake disc 12 may need to be replaced after the vehicle has been used for a period of time. For this, the electrical connection between the first electric circuit 14 and the second electric circuit 34 in the brake system provided in the present disclosure is designed not to hinder the brake disc 12 from detaching from the wheel hub 32.

Figure 3:
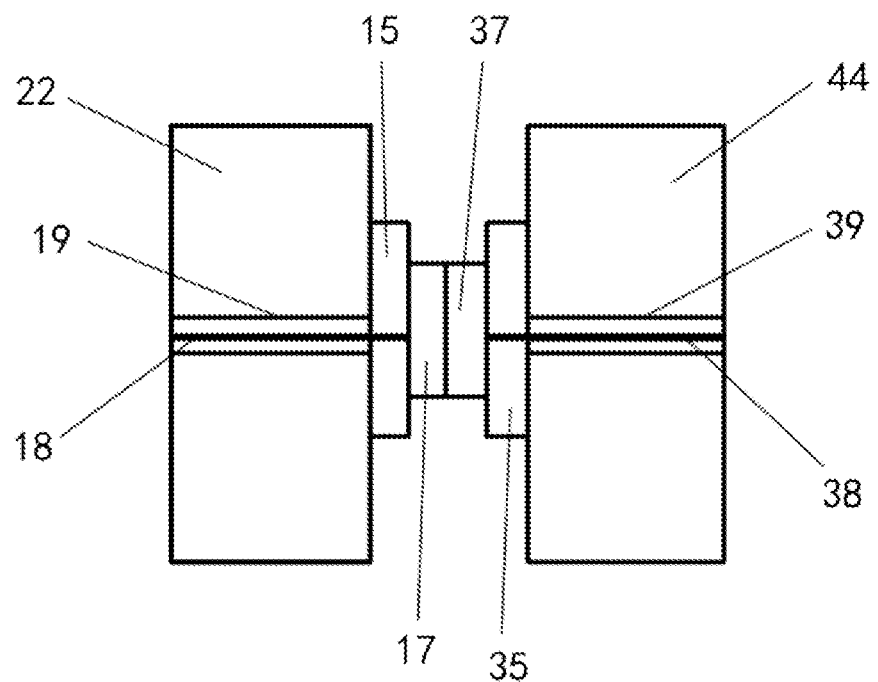
FIG. 3 is a detailed diagram of an electrical connection between first and second electric circuits of a brake system according to an embodiment of the present disclosure.

Optionally, referring to FIGS. 1 and 3, the first electric circuit 14 comprises a first electrically insulating sheet 15 attached to the disc core 22 and a first electrically conductive sheet 17 attached to the first insulating sheet 15. The first insulating sheet 15 has a first area covering the leading end 19 of the second channel and its surroundings. The first conductive sheet 17 has a second area smaller than the first area and disposed over the first insulating sheet 15. The leading end of the first conductive wire 18 passes through the first insulating sheet 15 to be electrically connected with the first conductive sheet 17.

The second electric circuit 34 comprises a second electrically conductive wire 38 embedded inside the wheel hub 32. For example, a third channel for receiving the second conductive wire 38 is pre-formed inside the wheel hub 32, thereby defining a guiding path of the second conductive wire 38. The guiding path of the second conductive wire 38 is desired to be as short as possible and easy to manufacture. For this, the third channel extends in conformity with a cross section of the wheel hub 32 taken along the line B-B (considering that the brake disc 12 is already connected to the wheel hub 32). For example, the third channel extends from the second outer wall 45 of the hub body 42 to the hub flange 44. A leading end of the third channel is open so that a leading end of the second conductive wire 38 can be led out from the second outer wall 45, and a tailing end 39 of the third channel (see FIG. 3) is open so that a tailing end of the second conductive wire 38 can be led out from the hub flange 44.

The second electric circuit 34 comprises a second electrically insulating sheet 35 attached to the hub flange 44 and a second electrically conductive sheet 37 attached to the second insulating sheet 35. The second insulating sheet 35 is similar to the first insulating sheet 15 and the second conductive sheet 37 is similar to the first conductive sheet 17, so that the tailing end of the second conductive wire 38 passes through the second insulating sheet 35 to be electrically connected with the second conductive sheet 37. When the wheel hub 32 is connected to the brake disc 12, the first conductive sheet 17 is aligned with and in contact with the second conductive sheet 37 to electrically connect the first conductive wire 18 with the second conductive wire 38, and the first insulating sheet 15 is aligned with and in contact with the second insulating sheet 35 to electrically insulate the first and second conductive sheets 17, 37 from the wheel hub 32 and the brake disc 12 both made of the metal material.

Figure 4:
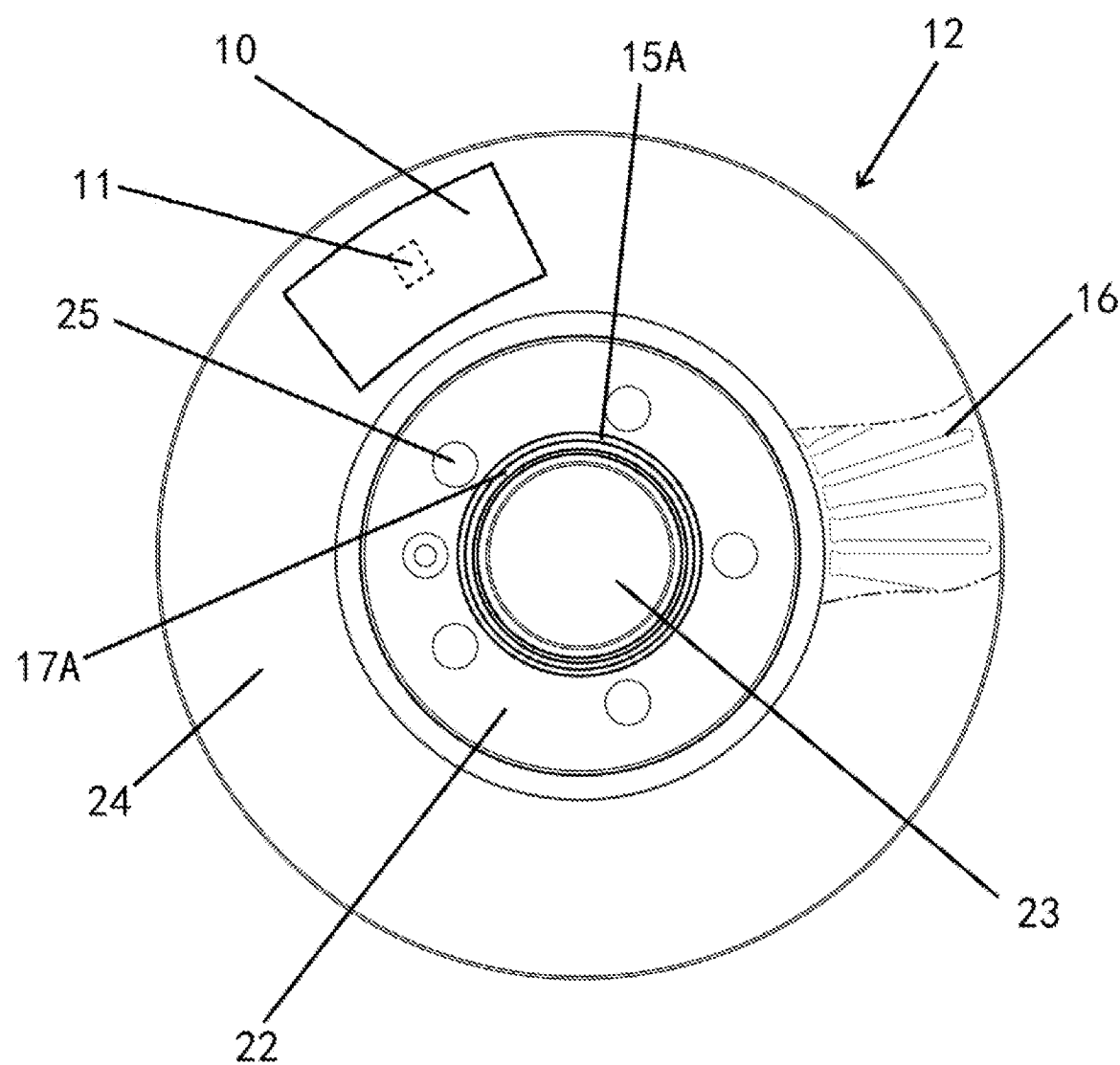
FIG. 4 is a front view of a brake system according to an embodiment of the present disclosure, showing the first electrically insulating and conductive rings related to a brake disc different from the configuration of the electrically insulating and conductive sheets shown in FIGS. 1 and 3.

Optionally, referring to FIG. 4, the first insulating sheet can be formed as a first electrically insulating ring 15A attached to the disc core 22 around central hole 23 and the first conductive sheet can be formed as a first electrically conductive ring 17A attached to the first insulating ring 15A in a circumferential direction, such that the first electric circuit 14 can be electrically connected with the second electric circuit 34 more easily when mounting the wheel hub 32 to the brake disc 12.

It should be understood that although only for illustration it is shown in FIG. 3 that the first and second conductive sheets 17, 37 and the first and second insulating sheets 15, 35 have large thicknesses separating the disc core 22 and the hub flange 44, they actually are too thin to separate the disc core 22 and the hub flange 44, and hence the connection between the brake disc 12 and the wheel hub 32 is not affected.

Figure 5:
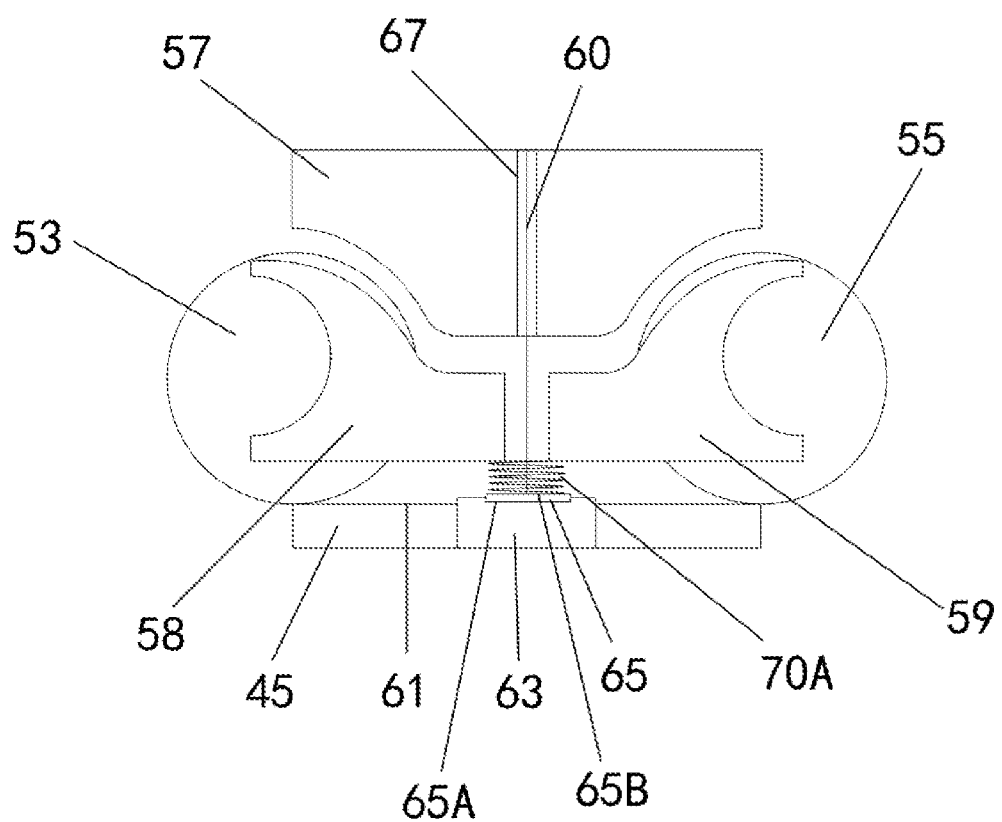
FIG. 5 is a detailed diagram of an electrical connection between the second and third electric circuits of a brake system according to an embodiment of the present disclosure.

Referring to FIGS. 2 and 5, the bearing assembly 52 comprises a plurality of rolling elements arranged rotatably around the second outer wall 45. For example, the rolling elements are configured as balls. Optionally, the plurality of rolling elements comprises a first row of rolling elements 53 and a second row of rolling elements 55 spaced apart with each other in the axial direction A. Thus, the second outer wall 45 constitutes a part of an inner race for the bearing assembly 52 to support the plurality of rolling elements from a radially inner side, and the remaining part of the inner race is constituted by a bushing 56 additionally arranged around the second outer wall 45. The bearing assembly 52 further comprises an outer race 57 arranged around the plurality of rolling elements to support the plurality of rolling elements from a radially outer side. Moreover, sealing rings are disposed at both ends of the outer race 57 in the axial direction A to define an internal space with the bearing assembly 52, the second outer wall 45 and the bushing 56.

There are provided a first cage 58 for holding the first row of rolling elements 53 and a second cage 59 for holding the second row of rolling elements 55. The first cage 58, the second outer wall 45, and the outer race 57 restrict each rolling element in the first row of rolling elements 53 in the internal space separately. Similarly, the second cage 59, the second outer wall 45, the outer race 57, and the bushing 56 restrict each rolling element in the second row of rolling elements 55 in the internal space separately. Moreover, in the internal space, the first cage 58 is separated from the second cage 59 by a first gap, and the first and second cages 58, 59 are separated from the second outer wall 45 by a second gap and are separated from the outer race 57 by a third gap.

When the vehicle is traveling, the wheel hub 32 is driven to rotate about the axial direction A, and the rotating wheel hub 32 causes each rolling element in the first row and the second row of rolling elements 53, 55 to rotate about its corresponding center, while the first and second cages 58, 59 and the outer race 57 are generally stationary. In an exemplary brake system provided by the present disclosure, the electrical connection between the second electric circuit 34 and the third electric circuit 54 is adapted to a relative movement of the wheel hub 32 and the outer race 57 of the bearing assembly 52.

Optionally, the second outer wall 45 is coated with an electrically insulating layer 61, and the second electric circuit 34 further comprises an electrically conductive loop 63 aligned with the first gap and mounted around the insulating layer 61. Similar to that the leading end of the first conductive wire 18 passes through the first insulating sheet 15 to be electrically connected with the first conductive sheet 17, a leading end of the second conductive wire 38 passes through the insulating layer 61 to be electrically connected with the conductive loop 63. The third electric circuit 54 comprises a brush terminal 65 in contact with and slidable relative to the conductive loop 63. As such, when the conductive loop 63 is rotated with the wheel hub 32, the brush terminal 65 would not be rotated but remain stationary with respect to the first and second cages 58, 59 and the outer race 57. The brush terminal 65 can be made of graphite or other electrically conductive materials. The brush terminal 65 comprises a first surface 65A and a second surface 65B opposite to the first surface 65A in a radial direction of the conductive loop 63. The first surface 65A is in contact with and slidable relative to the conductive loop 63. The first surface 65A can be sized and shaped in various ways.

Optionally, the third electric circuit 54 comprises a third electrically conductive wire 60 embedded inside the outer race 57. For example, a fourth channel for receiving the third conductive wire 60 is pre-formed inside the outer race 57, thereby defining a part of a guiding path of the third conductive wire 60. The guiding path of the third conductive wire 60 should be as short as possible and easy to manufacture. A leading end of the fourth channel is open so that a leading end of the third conductive wire 60 can be led out from the outer race 57, and a tailing end 67 of the fourth channel (see FIG. 5 or 6) is open so that a tailing end of the third conductive wire 60 is led into the internal space from the outer race 57. The tailing end 67 of the fourth channel is aligned with the first gap, such that the tailing end of the third conductive wire 60 passes straight through the first gap to be electrically connected with the second surface 65B of the brush terminal 65.

Optionally, the third electric circuit 54 further comprises an elastic element that presses against the second surface 65B to apply a radial force to the brush terminal 65 in a direction toward a center of the conductive loop 63, such that the brush terminal 65 is kept in contact with the conductive loop 63. For example, one end of the elastic element abuts against the first and second cages 58, 59, and the other end of the elastic element abuts against the brush terminal 65, such that the elastic element is preloaded with a force opposite to the radial force.

Optionally, referring to FIG. 5, the second surface 65B has a width in the axial direction A greater than the first gap, and the elastic element is configured as a coil spring 70A which has a diameter greater than the width of first gap in the axial direction A. As such, one end of the coil spring 70A is fixed to the first cage 58 and the second cage 59, spanning across the first gap, while the other end of the coil spring 70A is fixed to the second surface 65B. The coil spring 70A is compressed as the second gap has a radial width in a direction perpendicular to the axial direction A that is smaller than the free-state length of the coil spring 70A. In this case, the first and second cages 58, 59 are made of a non-metallic material, such as a composite material, so as to have an electrically insulating property.

Figure 6:
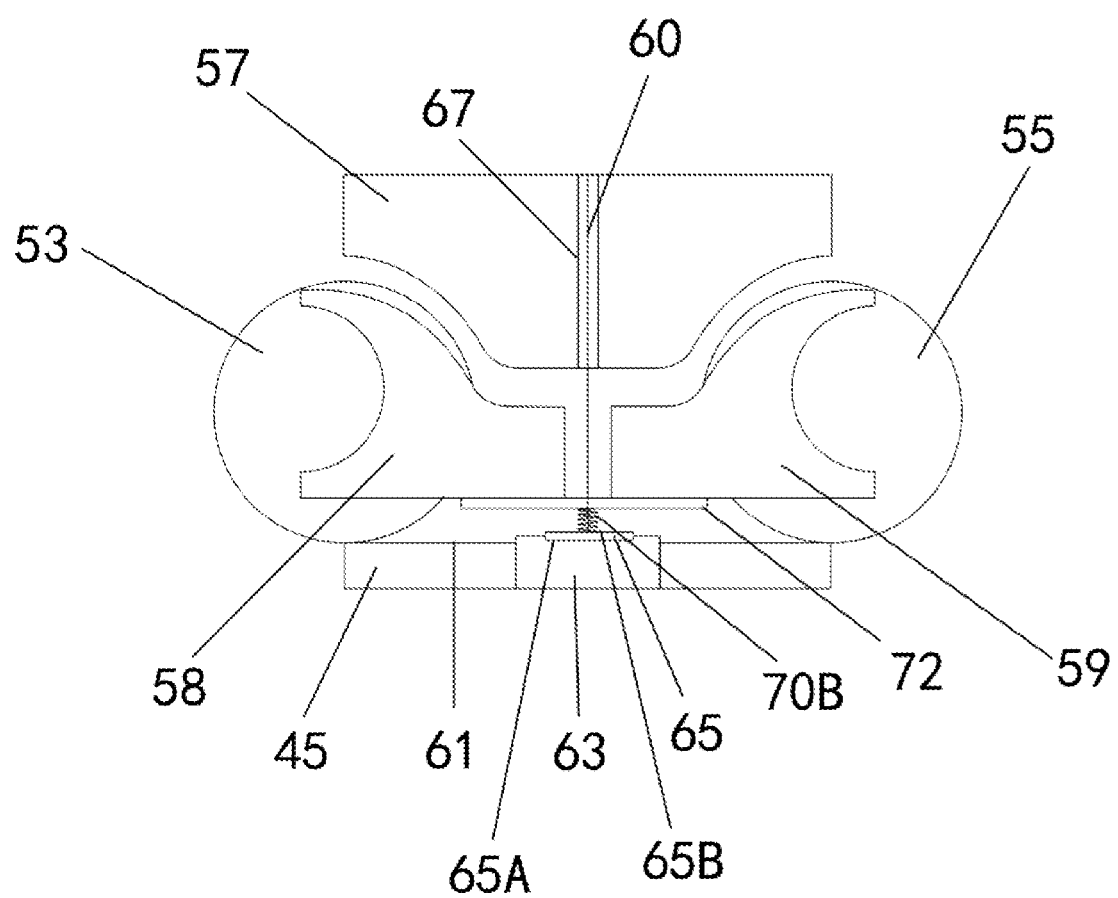
FIG. 6 is a detailed diagram of an electrical connection between the second and third electric circuits of a brake system according to another embodiment of the present disclosure.

Optionally, referring to FIG. 6, the elastic element is a coil spring 70B that has a diameter smaller than the width of the first gap in the axial direction A. In this case, the third electric circuit comprises a third electrically insulating sheet 72 attached to the first and second cages 58, 59, spanning across the first gap, and the tailing end of the third conductive wire 60 passes through the third insulating sheet 72 from the first gap to be electrically connected with the second surface 65B of the brush terminal 65. As such, the elastic element abuts against the first and second cages 58, 59 via the third insulating sheet 72.

It should be understood that the elastic element has an electrically insulating property. For example, the coil springs 70A, 70B can be made of or be coated with an electrically insulating material. Other types of elastic elements can be used, for example, an elastic tab made of rubber, foam, or the like.

Figure 7:
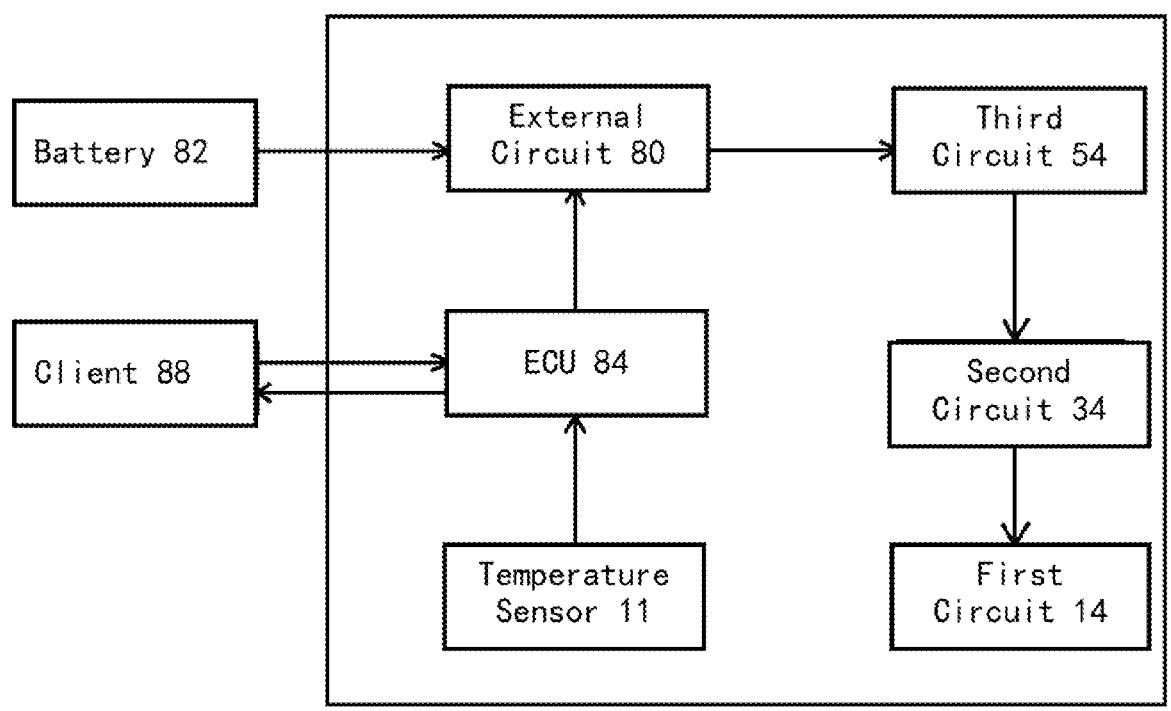
FIG. 7 is a schematic block diagram of a brake system according to an embodiment of the present disclosure.

Optionally, referring to FIGS. 1 and 7, the leading end of the third conductive wire 60 is electrically connected with an external electric circuit 80 arranged at a suitable position in the vehicle via the guiding path of the third conductive wire 60, and the external electric circuit 80 is in turn electrically connected with a positive terminal of a rechargeable battery 82 of the vehicle. Moreover, setting the external electric circuit 80 on and off can be controlled by an ECU (Electronic Control Unit) 84 of the vehicle. Since a negative terminal of the rechargeable battery 82 is electrically connected with a vehicle body made of a metal material and having a direct or indirect physical connection with the brake disc 12, the vehicle body and the brake disc 12 as a whole are functioned as the negative electrode for conducting the electric current flowing through the resistance wire 16, such that the electric circuits of the brake system for heating the brake disc 12 are configured as a single wire electrically connected only with the positive terminal of the rechargeable battery 82.

Optionally, the ambient temperature near the brake pad 10 can be detected by a temperature sensor 11, such as a thermocouple, embedded inside the brake pad 10, and a temperature signal related to the ambient temperature near the brake pad 10 is then transmitted to the ECU 84. Moreover, the ECU 84 is configured to control the on and off of the external electric circuit 80 based on the temperature signal sent by the temperature sensor 11. For example, when the detected temperature is lower than a preset temperature, the ECU 84 switches the external electric circuit 80 to be on to allow the electric current flows from the positive terminal of the rechargeable battery 82 through the external electric circuit 80, the third electric circuit 54 and the second electric circuit 34 to the first electric circuit 14, the resistance wire 16 of the first electric circuit 14 converts the electric current flowing to the resistance wire 16 into heat for applying to the disc body 24.

It should be understood that a user of the vehicle can control the on-off of the external electric circuit 80 by using any application program in a client 88 (for example, an APP in a mobile phone) to communicate with the ECU 84. For example, before driving the vehicle, the user can decide whether to switch on the external electric circuit 80 by the ECU 84 for a period of time based on temperature information obtained from a weather forecast or any other channels. Additionally or alternatively, the user can decide whether to switch on the external electric circuit 80 by the ECU 84 based on the detected temperature from the temperature sensor 11.

Although some specific embodiments of the present disclosure have been demonstrated in detail with examples, it should be understood by those skilled in the art that the above examples are only intended to be illustrative but not to limit the scope of the present disclosure and the above embodiments could be modified without departing from the scope and spirit of the present disclosure.

The invention claimed is:

1. A brake system comprising a brake disc, a wheel hub connected to the brake disc, and a bearing assembly mounted around the wheel hub, the brake system comprising:
   a first electric circuit embedded inside the brake disc;
   a second electric circuit embedded inside the wheel hub and electrically connected with the first electric circuit; and
   a third electric circuit embedded inside the bearing assembly and electrically connected with the second electric circuit,
   wherein when an electric current flows to the first electric circuit through the second and third electric circuits, the first electric circuit generates heat for applying to the brake disc.

2. The brake system according to claim 1, wherein the brake disc comprises a disc core and a disc body protruding radially from the disc core, the first electric circuit comprising an electrical resistance wire embedded inside the disc body for generating the heat and a first electrically conductive wire embedded inside the disc core and electrically connected with the resistance wire.

3. The brake system according to claim 2, wherein the first electric circuit further comprises a first electrically insulating sheet attached to the disc core and a first electrically conductive sheet attached to the first insulating sheet, the first conductive wire passing through the first insulating sheet to be electrically connected with the first conductive sheet, and the second electric circuit comprises a second electrically conductive wire, a second electrically insulating sheet attached to the wheel hub, and a second electrically conductive sheet attached to the second insulating sheet, the second conductive wire passing through the second insulating sheet to be electrically connected with the second conductive sheet, and when the wheel hub is connected to the brake disc, the first conductive sheet is aligned with and in contact with the second conductive sheet.

4. The brake system according to claim 3, wherein the first insulating sheet is formed as an electrically insulating ring that is attached to the disc core in a circumferential direction and the first conductive sheet is formed as an electrically conductive ring that is attached to the insulating ring in the circumferential direction.

5. The brake system according to claim 4, wherein the wheel hub comprises an outer wall around which the bearing assembly is mounted and which is coated with an electrically insulating layer, the second electric circuit further comprises an electrically conductive loop arranged around the insulating layer, the second conductive wire passing through the insulating layer to be electrically connected with the conductive loop, and the third electric circuit comprises a brush terminal configured to be in contact with and slidable relative to the conductive loop.

6. The brake system according to claim 5, wherein the third electric circuit further comprises an elastic element, the elastic element pressing the brush terminal against the conductive loop with a radial force directed towards a center of the conductive loop.

7. The brake system according to claim 6, wherein the bearing assembly comprises a first row and a second row of rolling elements arranged around the outer wall, a first cage for holding the first row of rolling elements, and a second cage for holding the second row of rolling elements, one end of the elastic element abutting against the first and second cages, and the other end of the elastic element abutting against the brush terminal, such that the elastic element is preloaded with a force opposite to the radial force.

8. The brake system according to claim 7, wherein the first and second cages are made of an electrically insulating material and a gap is formed between the first and second cages, the one end of the elastic element abutting against the first and second cages by spanning across the gap.

9. The brake system according to claim 7, wherein a gap is formed between the first and second cages, and wherein the third electric circuit further comprises a third electrically insulating sheet and a third electrically conductive wire, the third electrically insulating sheet being attached to the first and second cages by spanning across the gap, such that the one end of the elastic element abuts against the first and second cages via the third insulating sheet, and the third electrically conductive wire passing through the third insulating sheet to be electrically connected with the brush terminal.

10. The brake system according to claim 3, wherein the wheel hub comprises an outer wall around which the bearing assembly is mounted and which is coated with an electrically insulating layer, the second electric circuit further comprises an electrically conductive loop arranged around the insulating layer, the second conductive wire passing through the insulating layer to be electrically connected with the conductive loop, and the third electric circuit comprises a brush terminal configured to be in contact with and slidable relative to the conductive loop.

11. The brake system according to claim 10, wherein the third electric circuit further comprises an elastic element, the elastic element pressing the brush terminal against the conductive loop with a radial force directed towards a center of the conductive loop.

12. The brake system according to claim 11, wherein the bearing assembly comprises a first row and a second row of rolling elements arranged around the outer wall, a first cage for holding the first row of rolling elements, and a second cage for holding the second row of rolling elements, one end of the elastic element abutting against the first and second cages, and the other end of the elastic element abutting against the brush terminal, such that the elastic element is preloaded with a force opposite to the radial force.

13. The brake system according to claim 12, wherein the first and second cages are made of an electrically insulating material and a gap is formed between the first and second cages, the one end of the elastic element abutting against the first and second cages by spanning across the gap.

14. The brake system according to claim 12, wherein a gap is formed between the first and second cages, and wherein the third electric circuit further comprises a third electrically insulating sheet and a third electrically conductive wire, the third electrically insulating sheet being attached to the first and second cages by spanning across the gap, such that the one end of the elastic element abuts against the first and second cages via the third insulating sheet, and the third electrically conductive wire passing through the third insulating sheet to be electrically connected with the brush terminal.

15. The brake system according to claim 3, further comprising an external electric circuit electrically connected with the third electric circuit and an electronic control unit configured to control on and off of the external electric circuit.

16. The brake system according to claim 15, further comprising a brake pad and a temperature sensor configured to detect an ambient temperature near the brake pad and embedded inside the brake pad, wherein the electronic control unit is configured to control the on and off of the external electric circuit based on the detected ambient temperature.

17. The brake system according to claim 2, further comprising an external electric circuit electrically connected with the third electric circuit and an electronic control unit configured to control on and off of the external electric circuit.

18. The brake system according to claim 17, further comprising a brake pad and a temperature sensor configured to detect an ambient temperature near the brake pad, wherein the electronic control unit is configured to control the on and off of the external electric circuit based on the detected ambient temperature.

19. The brake system according to claim 1, further comprising an external electric circuit electrically connected with the third electric circuit and an electronic control unit configured to control on and off of the external electric circuit.

20. The brake system according to claim 19, further comprising a brake pad and a temperature sensor configured to detect an ambient temperature near the brake pad, wherein the electronic control unit is configured to control the on and off of the external electric circuit based on the detected temperature.

* * * * *